(12) United States Patent
Feng et al.

(10) Patent No.: US 9,378,341 B2
(45) Date of Patent: Jun. 28, 2016

(54) ELECTRONIC DEVICE AND AUDIO PROCESSING METHOD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Xue-Wen Feng, Shenzhen (CN); Shou-Ke Ma, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 74 days.

(21) Appl. No.: 14/100,187

(22) Filed: Dec. 9, 2013

(65) Prior Publication Data

US 2014/0169559 A1    Jun. 19, 2014

(30) Foreign Application Priority Data

Dec. 14, 2012 (CN) .......................... 2012 1 05422405

(51) Int. Cl.
*G06F 21/16* (2013.01)

(52) U.S. Cl.
CPC ...................................... *G06F 21/16* (2013.01)

(58) Field of Classification Search
CPC ......................................................... G06F 21/16
USPC ............................................................ 713/176
See application file for complete search history.

(56) References Cited

U.S. PATENT DOCUMENTS

| | | | |
|---|---|---|---|
| 8,180,098 B2 * | 5/2012 | Kalker | 382/100 |
| 9,002,489 B2 * | 4/2015 | Toyama | H04R 3/007 381/56 |
| 2003/0101052 A1 * | 5/2003 | Chen et al. | 704/223 |
| 2003/0204727 A1 * | 10/2003 | Sasaki | 713/176 |
| 2006/0239500 A1 * | 10/2006 | Meyer et al. | 382/100 |
| 2009/0216353 A1 * | 8/2009 | Van Reck | 700/94 |
| 2013/0331971 A1 * | 12/2013 | Bida et al. | 700/94 |

* cited by examiner

*Primary Examiner* — Eleni Shiferaw
*Assistant Examiner* — Alexander Lapian
(74) *Attorney, Agent, or Firm* — ScienBiziP, P.C.

(57) ABSTRACT

An audio processing method for an electronic device includes a first audio file, a second audio file, and a first digital watermark to perform an audio processing method. The first digital watermark has ownership information regarding the first audio file. A first discrete audio array of the first audio file and a second discrete audio array of the second audio file are generated. A cipher code is generated using the first discrete audio array and the first digital watermark, and a second digital watermark is generated using the cipher code and the second discrete audio array. The first and second digital watermarks are compared, to confirm common ownership or otherwise of the second and first audio files.

12 Claims, 3 Drawing Sheets

ELECTRONIC DEVICE AND AUDIO PROCESSING METHOD

BACKGROUND

1. Technical Field

Embodiments of the present disclosure relate to audio processing technologies, and particularly to an audio processing method using an electronic device 2. Description of Related Art To protect the rights of owners of audio content such as music, watermarking technologies can be used to embed secret data of the owners in the frequency domain of an audio signal, thus providing proof of ownership of the audio content. However, a great number of operations, such as fast Fourier transformation (FFT) operations, are needed to embed the secret data in the frequency domain, which is inefficient. In addition, the secret data may be encoded as a pseudo-random sequence used to guide the modification of each magnitude or phase component of the frequency domain, and an ad hoc ("on-the-fly") decoding process can adversely affect the acoustic quality of the audio signal. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
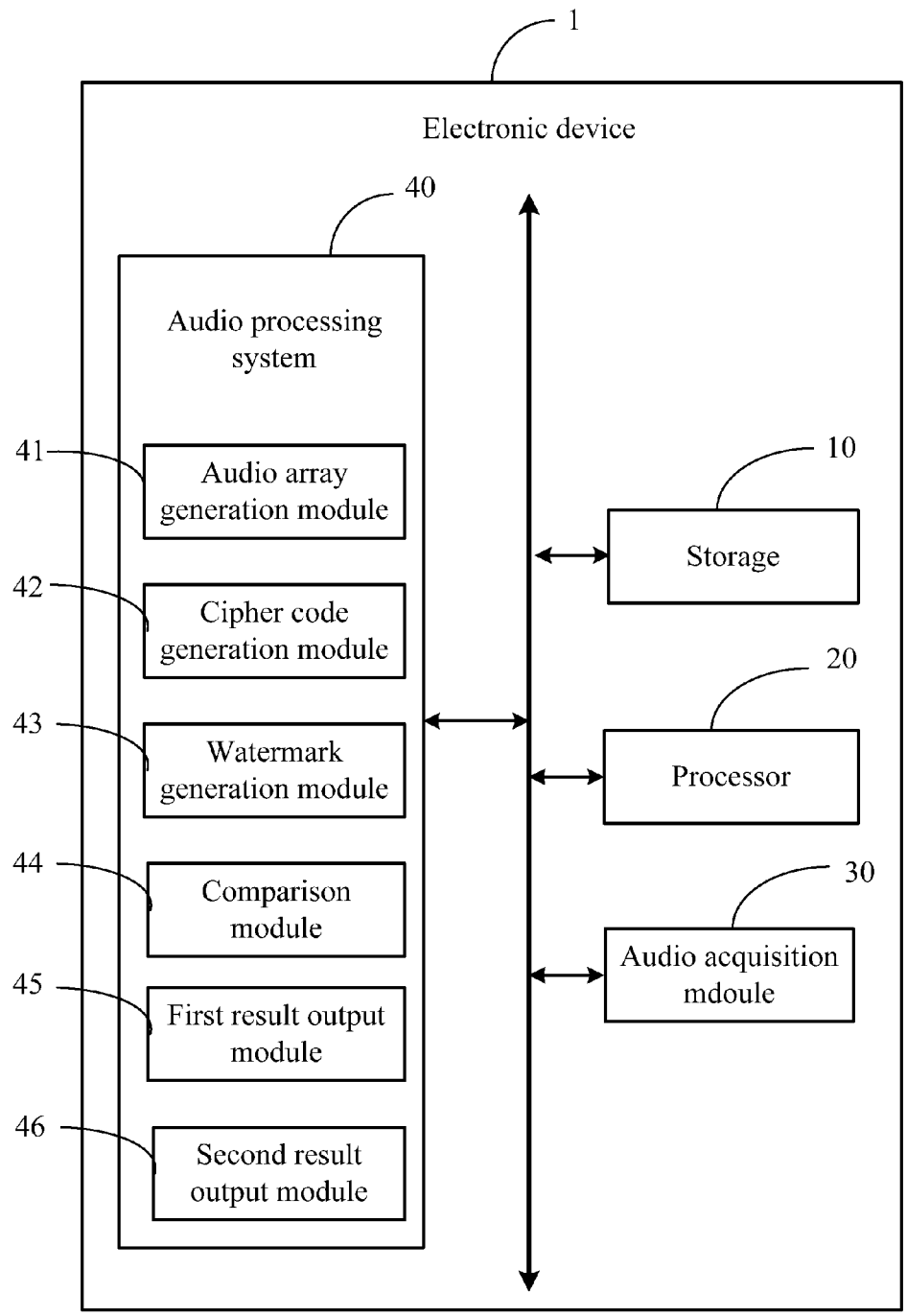
FIG. 1 is a schematic block diagram illustrating one embodiment of an electronic device.

FIG. 1 is a schematic block diagram illustrating one embodiment of an electronic device 100. The electronic device 100 includes a storage 10, a processor 20, an audio acquisition device 30, and an audio processing system 40. The audio acquisition device 30 can be a microphone, configured to acquire sound to generate a first audio file. The storage 10 stores a first digital watermark including information of an owner of the first audio file to provide proof of ownership of the first audio file. The first digital watermark includes a plurality of discrete binary values, such as "001011010101." In other embodiments, the first audio file can be another audio file prestored in the electronic device 100. The electronic device 100 can be a computer, a server, a smart phone, or similar device. The electronic device 100 can include more or fewer components than those shown in the embodiment, or have a different configuration of the components.

Figure 2:
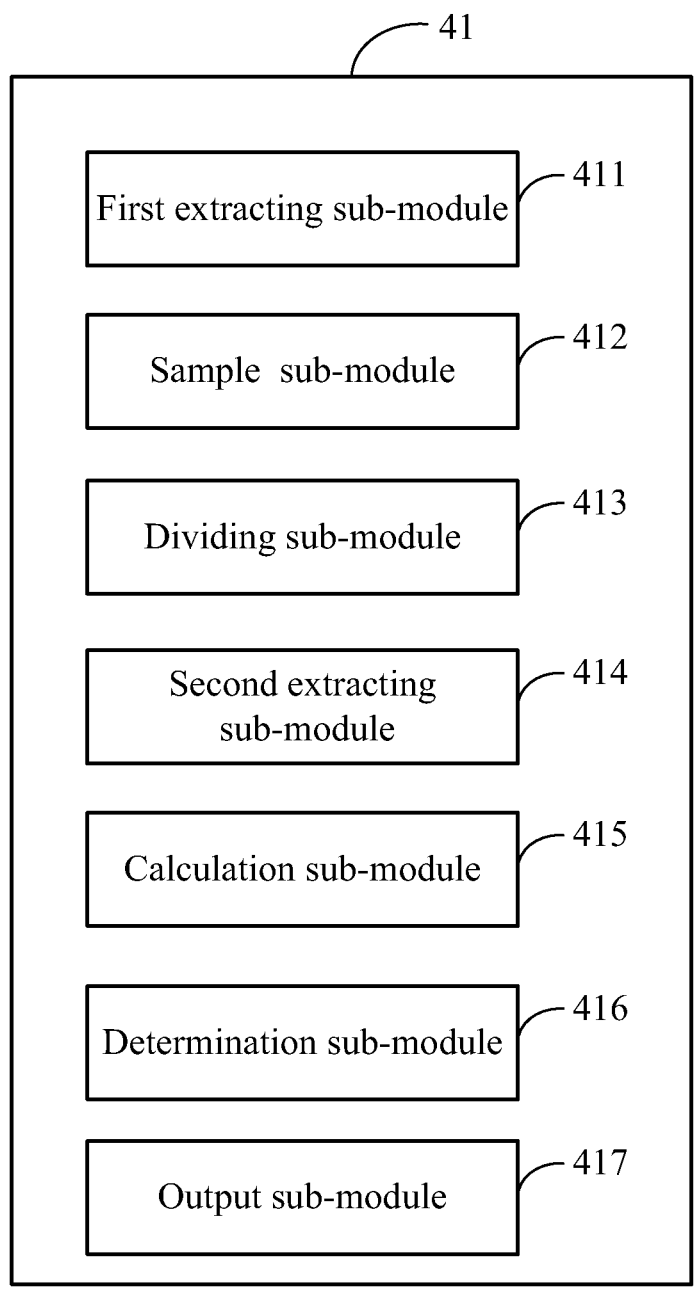
FIG. 2 is a schematic block diagram of one embodiment of an audio array generation module of FIG. 1 including a plurality of sub-modules.

The audio processing system 40 can include a plurality of programs in the form of one or more computerized instructions stored in the storage 10 and executed by the processor 20 to perform operations of the electronic device 200. The audio processing system 40 processes a second audio file to determine whether or not the second audio file has a same owner as the first audio file, to protect the rights of the owner. In the embodiment, the audio processing system 40 includes a menu acquisition module 101, an application search module 102, a menu correlation module 103, an icon display module 104, and an application activation module 105. Referring to FIG. 2, the audio array generation module 41 of the audio processing system 40 further includes a plurality of sub-modules, which are a first extracting sub-module 411, a sample sub-module, a dividing sub-module 413, a second extracting sub-module 414, a calculation sub-module 415, a determination sub-module 416, and an output sub-module 417. The storage 10 may be an external or embedded storage medium of the electronic device 100, which can be a secure digital memory (SD) card, a Trans Flash (TF) card, a compact flash (CF) card, or a smart media (SM) card.

In general, the word "module", as used herein, refers to logic embodied in hardware or firmware, or to a collection of software instructions, written in a programming language, such as, Java, C, or assembly. One or more software instructions in the modules can be embedded in firmware, such as in an erasable programmable read only memory (EPROM). The modules described herein can be implemented as either software and/or hardware modules and can be stored in any type of non-transitory computer-readable medium or other storage devices. Some non-limiting examples of non-transitory computer-readable medium include CDs, DVDs, BLU-RAY, flash memory, and hard disk drives.

Figure 3:
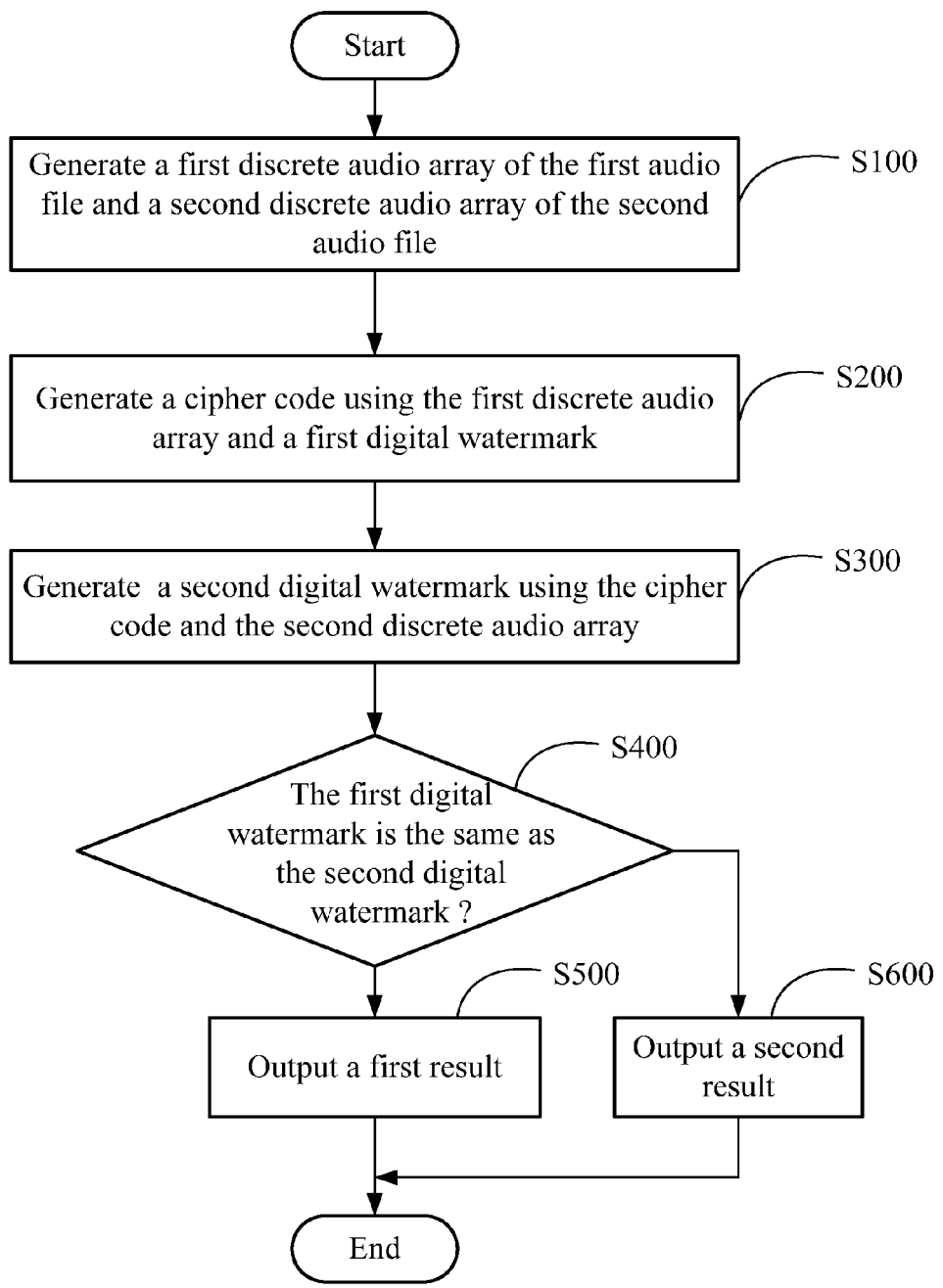
FIG. 3 is a flowchart of one embodiment of an audio processing method implemented by electronic device of FIG. 1.

FIG. 3 shows a flowchart of one embodiment of an audio processing method using the functional modules of the audio processing system 40 of FIG. 1. Depending on the embodiment, additional steps may be added, others removed, and the ordering of the steps may be changed.

In step S100, the audio array generation module 41 generates a first discrete audio array of the first audio file and a second discrete audio array of the second audio file according to audio signals of the first audio file and the second audio file. In this embodiment, the first discrete audio array and the second discrete audio array are generated using the sub-modules of the audio array generation module 41. One process of generating the first discrete audio array of the first audio file and the second discrete audio array of the second audio file is described below.

The first extracting sub-module 411 extracts first audio signals having a frequency less than a predetermined frequency from the first audio file. In this embodiment, the predetermined frequency is about 0.4 KHz. The sample sub-module 412 samples the first audio signals to obtain a first sample sequence. The dividing sub-module 413 divides the first sample sequence into a plurality of first sub-sequences. Each first sub-sequence includes a number of sampling points. An amount of sampling points of each sub-sequence is equal to an amount of discrete binary values of the first digital watermark. The second extracting sub-module 414 extracts a sampling point having a maximum value in each first sub-sequence to form a first maximum value array. The first maximum value array includes the extracted sampling point of each first sub-sequence. The calculation sub-module 415 calculates a first average value of the sampling points of the first maximum value array. The determination sub-module 416 determines whether or not a value of each sampling point of the first maximum value array is greater than or equal to the first average value. If the value of a sampling point of the first maximum value array is greater than or equal to the first average value, the output sub-module 417 outputs a digital "1" to represent the value of the sampling point. If the value of a sampling point of the first maximum value array is less than the first average value, the output sub-module 417 outputs a digital "0" to represent the value of the sampling point. The output digit of the output sub-module 417 is arranged in a first predetermined array in sequence to form the first discrete audio array of the first audio file.

The second discrete audio array of the second audio file is generated using the same manner as above. In detail, the first extracting sub-module 411 extracts second audio signals having a frequency less than the predetermined frequency from the second audio file. The sample sub-module 412 samples the second audio signals to obtain a second sample sequence. The dividing sub-module 413 divides the second sample sequence into a plurality of second sub-sequences. Each second sub-sequence includes a number of sampling points. An amount of sampling points of each second sub-sequence is equal to the amount of the discrete binary values of the first digital watermark. The second extracting sub-module 414 extracts a sampling point having a maximum value in each second sub-sequence to form a second maximum value array. The second maximum value array includes the extracted sampling point of each second sub-sequence. The calculation sub-module 415 calculates a second average value of the sampling points of the second maximum value array. The determination sub-module 416 determines whether or not a value of each sampling point of the second maximum value array is greater than or equal to the second average value. If the value of a sampling point of the second maximum value array is greater than or equal to the second average value, the output sub-module 417 outputs a digital "1" to represent the value of the sampling point. If the value of a sampling point of the second maximum value array is less than the second average value, the output sub-module 417 outputs a digital "0" to represent the value of the sampling point. The output of the output sub-module 417 is arranged in a second predetermined array in sequence to form the second discrete audio array of the first audio file.

In step S200, the cipher code generation module 42 generates a cipher code using the first discrete audio array and the first digital watermark. In this embodiment, the cipher code generation module 42 performs an exclusive or (XOR) logic operation between the first discrete audio array and the first digital water mark to obtain the cipher code.

In step S300, the watermark generation module 43 generates a second digital watermark using the cipher code and the second discrete audio array. In this embodiment, the watermark generation module 43 performs an XOR logic operation between the second discrete audio array and the cipher code to generate the second digital watermark.

In step S400, the comparison module 44 compares the first digital watermark with the second digital watermark, to determine whether or not the first digital watermark is the same as the second digital watermark. If the first digital watermark is the same as the second digital watermark, step S500 is implemented. If the first digital watermark is different from the second digital watermark, step S600 is implemented.

In step S500, the first result output module 45 outputs a first result indicating that the second audio has the same ownership with the first audio file, and the procedure ends.

In step S600, the second result output module 46 outputs a second result indicating that the second audio has a different ownership from the first audio file. In this embodiment, both the first and second results may be texts, voices, images, or other information.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized audio processing method using an electronic device storing a first audio file, a second audio file, and a first digital watermark, the first digital watermark comprising information in relation to an ownership of the first audio file, the method comprising:
   generating a first discrete audio array of the first audio file and a second discrete audio array of the second audio file according to audio signals of the first audio file and the second audio file;
   generating a cipher code using the first discrete audio array and the first digital watermark;
   generating a second digital watermark using the cipher code and the second discrete audio array; and
   determining whether or not the first digital watermark is the same as the second digital watermark, to confirm whether or not the second audio file has the same ownership with the first audio file;
   wherein the first discrete audio array is generated by:
   extracting first audio signals having a frequency less than a predetermined frequency from the first audio file;
   sampling the first audio signals to obtain a first sample sequence;
   dividing the first sample sequence into a plurality of first sub-sequences, each first sub-sequence comprising a number of sampling points;
   extracting a sampling point having a maximum value in each first sub-sequence to form a first maximum value array;
   calculating a first average value of all sampling points of the first maximum value array;
   determining whether or not a value of each sampling point of the first maximum value array is greater than or equal to the first average value; and
   outputting a digital "1" to represent the value of a sampling point of the first maximum value array if the value of the sampling point is greater than or equal to the first average value, and outputting a digital "0" to represent the value of the sampling point if the value of the sampling point of the first maximum value array is less than the first average value, wherein each output digital "1" and "0" is arranged in a first predetermined array in sequence to form the first discrete audio array of the first audio file.

2. The method according to claim 1, further comprising:
   outputting a first result indicating that the second audio has the same ownership with the first audio file, if the first digital watermark is the same as the second digital watermark; and
   outputting a second result indicating that the second audio has a different ownership from the first audio file, if the first digital watermark is different from the second digital watermark.

3. The method according to claim 2, wherein the first and second results are texts, voices, or images.

4. The method according to claim 1, wherein the second discrete audio array is generated by:
   extracting second audio signals having a frequency less than the predetermined frequency from the second audio file;
   sampling the second audio signals to obtain a second sample sequence;
   dividing the second sample sequence into a plurality of second sub-sequences, each second sub-sequence comprising a number of sampling points;
   extracting a sampling point having a maximum value in each second sub-sequence to form a second maximum value array;

calculating a second average value of all sampling points of the second maximum value array;

determining whether or not a value of each sampling point of the second maximum value array is greater than or equal to the second average value; and outputting a digital "1" to represent the value of a sampling point of the second maximum value array if the value of the sampling point is greater than or equal to the second average value, and outputting a digital "0" to represent the value of the sampling point if the value of the sampling point of the second maximum value array is less than the second average value, wherein each output digital "1" and "0" is arranged in a second predetermined array in sequence to form the second discrete audio array of the second audio file.

5. The method according to claim 1, wherein the cipher code is generated by performing an exclusive or (XOR) logic operation between the first discrete audio array and the first digital watermark.

6. The method according to claim 1, wherein the second digital watermark is generated by performing an exclusive or (XOR) logic operation between the second discrete audio array and the cipher code.

7. An electronic device, comprising:

a storage storing a first audio file, a second audio file, and a first digital watermark, the first digital watermark comprising information in relation to an ownership of the first audio file;

a processor; and one or more programs executed by the processor to perform a method of:

generating a first discrete audio array of the first audio file and a second discrete audio array of the second audio file according to audio signals of the first audio file and the second audio file;

generating a cipher code using the first discrete audio array and the first digital watermark;

generating a second digital watermark using the cipher code and the second discrete audio array; and determining whether or not the first digital watermark is the same as the second digital watermark, to confirm whether or not the second audio file has the same ownership with the first audio file;

wherein the first discrete audio array is generated by:

extracting first audio signals having a frequency less than a predetermined frequency from the first audio file;

sampling the first audio signals to obtain a first sample sequence;

dividing the first sample sequence into a plurality of first sub-sequences, each first sub-sequence comprising a number of sampling points;

extracting a sampling point having a maximum value in each first sub-sequence to form a first maximum value array;

calculating a first average value of all sampling points of the first maximum value array;

determining whether or not a value of each sampling point of the first maximum value array is greater than or equal to the first average value; and outputting a digital "1" to represent the value of a sampling point of the first maximum value array if the value of the sampling point is greater than or equal to the first average value, and outputting a digital "0" to represent the value of the sampling point if the value of the sampling point of the first maximum value array is less than the first average value, wherein each output digital "1" and "0" is arranged in a first predetermined array in sequence to form the first discrete audio array of the first audio file.

8. The electronic device according to claim 7, wherein the method further comprises:

outputting a first result indicating that the second audio has the same ownership with the first audio file, if the first digital watermark is the same as the second digital watermark; and outputting a second result indicating that the second audio has a different ownership from the first audio file, if the first digital watermark is different from the second digital watermark.

9. The electronic device according to claim 8, wherein the first and second results are texts, voices, or images.

10. The electronic device according to claim 7, wherein the second discrete audio array is generated by:

extracting second audio signals having a frequency less than the predetermined frequency from the second audio file;

sampling the second audio signals to obtain a second sample sequence;

dividing the second sample sequence into a plurality of second sub-sequences, each second sub-sequence comprising a number of sampling points;

extracting a sampling point having a maximum value in each second sub-sequence to form a second maximum value array;

calculating a second average value of all sampling points of the second maximum value array;

determining whether or not a value of each sampling point of the second maximum value array is greater than or equal to the second average value; and outputting a digital "1" to represent the value of a sampling point of the second maximum value array if the value of the sampling point is greater than or equal to the second average value, and outputting a digital "0" to represent the value of the sampling point if the value of the sampling point of the second maximum value array is less than the second average value, wherein each output digital "1" and "0" is arranged in a second predetermined array in sequence to form the second discrete audio array of the second audio file.

11. The electronic device according to claim 7, wherein the cipher code is generated by performing an exclusive or (XOR) logic operation between the first discrete audio array and the first digital watermark.

12. The electronic device according to claim 7, wherein the second digital watermark is generated by performing an exclusive or (XOR) logic operation between the second discrete audio array and the cipher code.

* * * * *